(12) United States Patent
Akhalwaya

(10) Patent No.: US 11,023,494 B2
(45) Date of Patent: Jun. 1, 2021

(54) COMPUTER-IMPLEMENTED METHOD AND COMPUTER SYSTEM FOR CLUSTERING DATA

(71) Applicant: International Business Machines Corporation, Armonk, NY (US)

(72) Inventor: Ismail Y Akhalwaya, Emmarentia (SA)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 15/838,387

(22) Filed: Dec. 12, 2017

(65) Prior Publication Data

US 2019/0179950 A1    Jun. 13, 2019

(51) Int. Cl.
G06F 16/00    (2019.01)
G06F 16/28    (2019.01)

(52) U.S. Cl.
CPC .................................. *G06F 16/285* (2019.01)

(58) Field of Classification Search
CPC .................................................... G06F 16/285
See application file for complete search history.

(56) References Cited

U.S. PATENT DOCUMENTS

| | | | | |
|---|---|---|---|---|
| 5,859,929 A * | 1/1999 | Zhou | ...................... | G06K 9/346 382/175 |
| 6,581,058 B1 * | 6/2003 | Fayyad | ................... | G06F 16/30 707/737 |
| 6,628,821 B1 | 9/2003 | Covell et al. | | |
| 6,915,009 B2 | 7/2005 | Foote et al. | | |
| 7,469,246 B1 | 12/2008 | Lamping | | |
| 7,707,148 B1 * | 4/2010 | Fogel | ................... | G06K 9/6262 707/999.007 |
| 7,716,169 B2 * | 5/2010 | Park | ...................... | G16B 40/00 707/602 |

(Continued)

OTHER PUBLICATIONS

Krishnamoorthi, "Automatic Evaluation of Cluster in Unlabeled Datasets", 2011 International Conference on Information and Network Technology, 2011, pp. 120-124.

(Continued)

*Primary Examiner* — Anhtai V Tran
(74) *Attorney, Agent, or Firm* — Scully, Scott, Murphy & Presser, P C.; Shimon Benjamin

(57) ABSTRACT

An example embodiment of the invention provides a computer-implemented method of clustering data. The method comprises performing, by a clustering module, an $n^{th}$ pass of clustering on data to produce a plurality of $n^{th}$ clusters. A cluster analysis module calculates a plurality of components of each of the $n^{th}$ clusters and de-weights a largest component of each of the $n^{th}$ clusters to produce a plurality of de-weighted $n^{th}$ clusters. The clustering module performs an $n+1^{th}$ pass of clustering on the plurality of de-weighted $n^{th}$ clusters to produce a plurality of $n+1^{th}$ clusters. The method may be reiterated.

20 Claims, 4 Drawing Sheets

(56) References Cited

U.S. PATENT DOCUMENTS

| | | | | |
|---|---|---|---|---|
| 8,484,163 | B1* | 7/2013 | Yucel | G06F 11/1415 |
| | | | | 707/640 |
| 8,799,418 | B2* | 8/2014 | Rider | G06F 9/44505 |
| | | | | 709/203 |
| 9,336,302 | B1 | 5/2016 | Swamy | |
| 10,108,695 | B1* | 10/2018 | Yeturu | G06F 16/285 |
| 2003/0154181 | A1 | 8/2003 | Liu et al. | |
| 2008/0010304 | A1* | 1/2008 | Vempala | G06F 16/355 |
| 2008/0089561 | A1* | 4/2008 | Zhang | G06K 9/00228 |
| | | | | 382/118 |
| 2008/0170579 | A1* | 7/2008 | Chafle | H04L 67/1017 |
| | | | | 370/401 |
| 2008/0227063 | A1* | 9/2008 | Kenedy | G06F 16/951 |
| | | | | 434/219 |
| 2012/0209653 | A1* | 8/2012 | Andoji | G06Q 10/0639 |
| | | | | 705/7.26 |
| 2015/0120731 | A1 | 4/2015 | Nemery et al. | |
| 2015/0177011 | A1* | 6/2015 | Ibrahimi | G01C 21/343 |
| | | | | 701/465 |
| 2015/0286702 | A1* | 10/2015 | Shyr | G06F 16/9027 |
| | | | | 707/737 |
| 2017/0124478 | A1 | 5/2017 | Baradaran et al. | |
| 2017/0134240 | A1* | 5/2017 | Hevizi | H04L 41/069 |
| 2018/0165554 | A1* | 6/2018 | Zhang | G06K 9/6269 |
| 2018/0225213 | A1* | 8/2018 | Hum | G06F 12/084 |

OTHER PUBLICATIONS

Asadi et al., "Finding the Number of Clusters in Unlabelled Datasets Using Extended Cluster Count Extraction", International Journal of Computer Science and Information Technologies, 2011, pp. 1820-1824, vol. 2 (4).

Faceli et al., "Multi-Objective Clustering Ensemble", International Journal of Hybrid Systems, 2007, pp. 145-156.

Faceli et al., "Multi-Objective Clustering Ensemble with Prior Knowledge", Advances in Bioinformatics and Computational Biology, 2007, pp. 34-45.

Faceli et al., "A Strategy for the Selection of Solutions of the Pareto Front Approximation in Multi-Objective Clustering Approaches", 10th Brazilian Symposium on Neural Networks, 2008, pp. 27-32.

Jiamthapthaksin et al., "A Framework for Multi-Objective Clustering and Its Application to Co-Location Mining", Advanced Data Mining and Applications, 2009, pp. 188-199.

* cited by examiner

COMPUTER-IMPLEMENTED METHOD AND COMPUTER SYSTEM FOR CLUSTERING DATA

BACKGROUND

The present invention relates to data clustering and it relates specifically to a computer-implemented method and computer system for clustering data.

SUMMARY

An example embodiment of the invention provides a computer-implemented method of clustering data. The method comprises performing, by a clustering module, an $n^{th}$ pass of clustering on data to produce a plurality of $n^{th}$ clusters and calculating, by a cluster analysis module, a plurality of components of each of the $n^{th}$ clusters. The method comprises de-weighting, by the cluster analysis module, a largest or most common component of each of the $n^{th}$ clusters to produce a plurality of de-weighted $n^{th}$ clusters and then performing, by the clustering module, an $n+1^{th}$ pass of clustering on the plurality of de-weighted $n^{th}$ clusters to produce a plurality of $n+1^{th}$ clusters.

Example embodiments of the invention also provide a corresponding computer system and a computer program product.

DETAILED DESCRIPTION

An embodiment of the present invention relates to a computerized method and computer system for data clustering, which may be of particular relevance to unlabeled, unstructured, or unsupervised data.

Unsupervised data may have multiple ways of "slicing" or partitioning it, that reveal different structures within the data or different aspects about the data. This feature of multiple perspectives may be viewed as an unavoidable issue of a multiplicity of measures of similarity. An example embodiment of the present invention provides a method that may be used systematically to calculate or determine different measures of similarity which may lead to non-trivial mutually incompatible structures or clusters.

Figure 1:
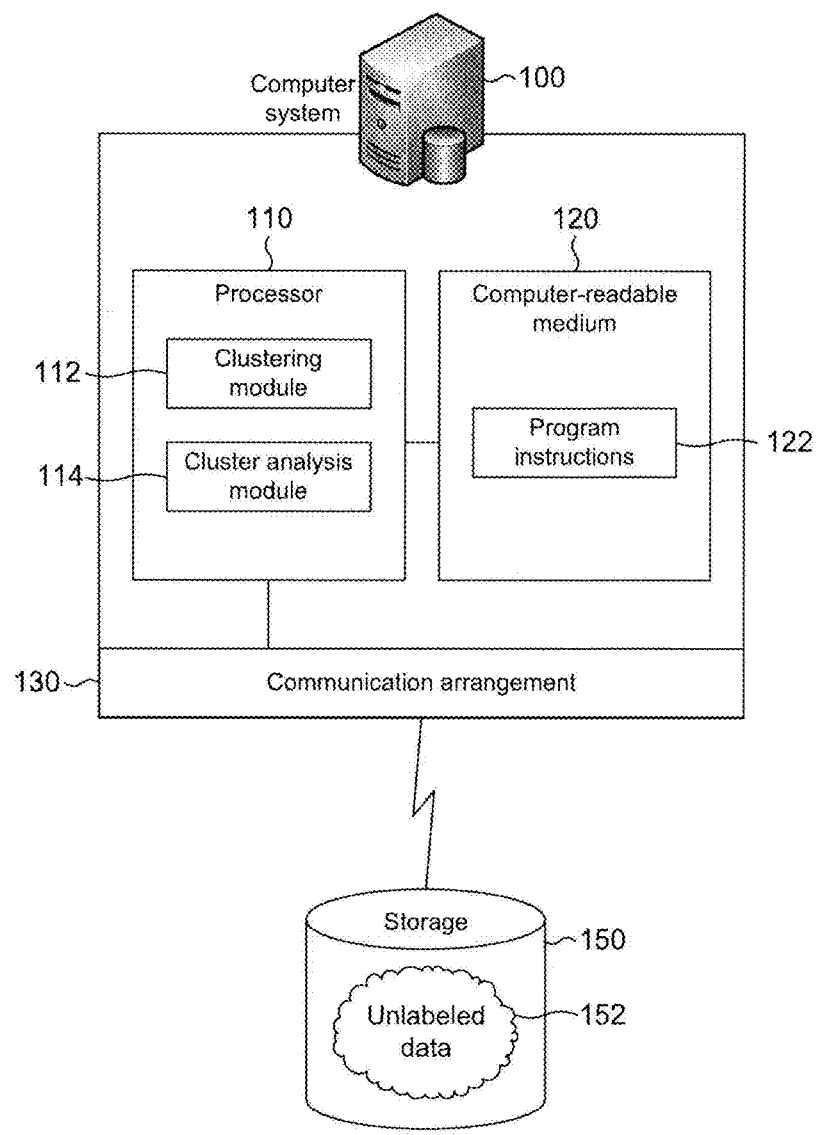
FIG. 1 illustrates a schematic view of a computer system for clustering data, in accordance with an embodiment of the invention.

FIG. 1 illustrates a computer system 100 for performing data clustering in accordance with an example embodiment of the invention. The computer system 100 comprises a computer processor 110 communicatively coupled to a non-transitory computer-readable medium 120. The computer processor 110 may be one or more microprocessors, controllers, or any other suitable computing resource, hardware, software, or embedded logic. Program instructions 122, forming part of a computer program product in accordance with an example embodiment of the invention, are stored on the computer-readable medium 120 and are configured to direct the operation of the processor 110.

The processor 110 (under the direction of the program instructions 122) comprises a plurality of conceptual modules 112, 114 which may correspond to functional tasks performed by the processor 110. The computer system 100 further comprises a communication arrangement 130 which enables communication or networking with other systems, devices, or nodes, either directly or via a telecommunications network. In this example embodiment, the communication arrangement 130 may be a network interface operable to connect the computer system 100 to data storage 150 comprising unlabeled or unsupervised data 152 and/or to the telecommunications network, e.g., the internet.

Although the data 152 is illustrated as being stored in a singular data storage 150 directly connected to the computer system 100, this may not necessarily be the case. Some or all of the data 152 may be cloud-hosted and/or hosted or stored on a plurality of distributed storage nodes. The data 152 may be pooled amongst public and/or private storage resources. An advantage of cloud-based computing is that shared and distributed storage resources are more readily available. However, this configuration may exacerbate the unstructured nature of the data 152 when the data being generated and/or stored is provided in different formats across different systems.

The modules 112, 114 provided by the processor 110 are a clustering module 112 and a cluster analysis module 114, each one relating to one or more aspects of data clustering. In broad terms, the data clustering module 112 is configured to perform a pass of data clustering. The clustering modules 112 may be configured to perform a standard or conventional clustering algorithm or method. Examples of clustering methods include k-means clustering, standard similarity norm, single-objective clustering, and multi-objective clustering.

The cluster analysis module 114 is configured to calculate and manipulate aspects relating to clustered data. Some of the calculation algorithms or methods may be standard or conventional. Example calculation methods include a compressed sensing approach, which yields a sparse representation, mean calculation, which yields a plurality of mean components, or archetypal analysis. Regardless to the specific method used for calculation, the cluster analysis module 114 is configured to calculate or determine a plurality of components of the data cluster.

The cluster analysis module 114 is also configured to manipulate (e.g., de-weight or remove) at least one of the components which it calculated. De-weighting may comprise applying one or more of orthogonal projection, Principal Component Analysis (PCA), eigenvector matrix analysis, non-negative matrix factorization, and/or archetypal analysis. The clustering module 112 and the cluster analysis module 114 may be configured to parse data (respectively, clustered data and manipulated data) back and forth between each other, thereby to perform plural passes or iterations of the process.

Figure 2:
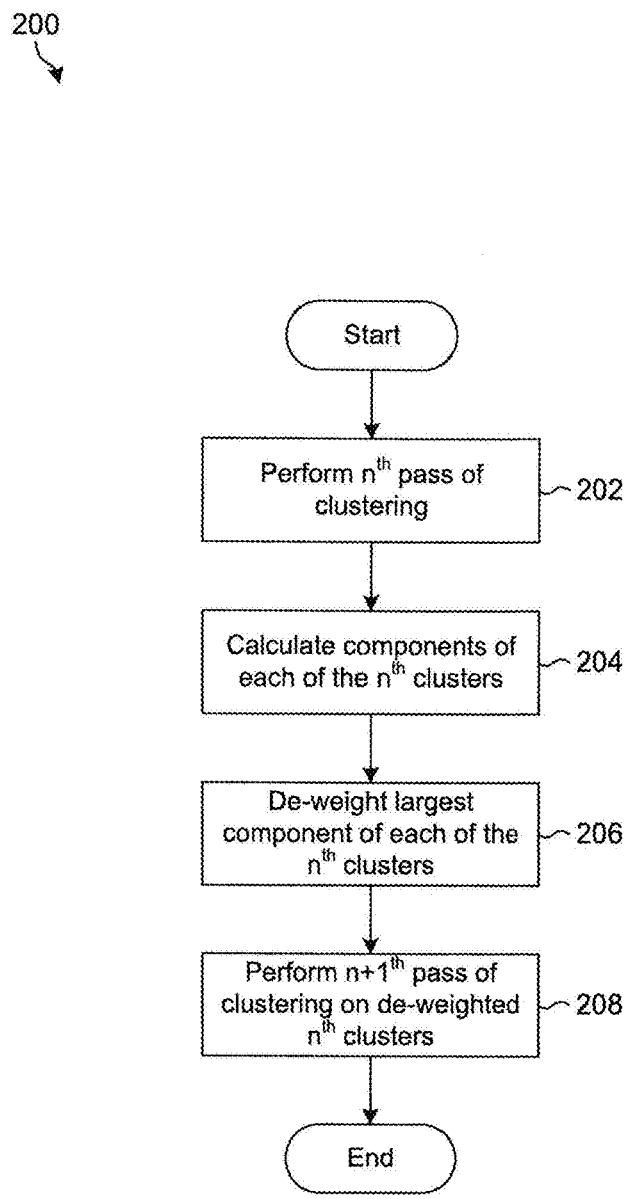
FIG. 2 illustrates a flow diagram of a method of clustering data, in accordance with an embodiment of the invention, in a basic implementation.

FIG. 2 illustrates a basic method 200 which may be implemented by the clustering module 112 and the cluster analysis module 114 of the computer system 100. The clustering module 112 is fed with the unlabeled data 152 and performs (at block 202) a first pass (n equals 1) of clustering to produce a plurality of first data clusters. The cluster analysis module 114 performs a first round of analysis on each of the first data clusters to calculate (at block 204) a plurality of components of each of the first clusters.

Sequentially or simultaneously, the cluster analysis module 114 de-weights (at block 206) a largest, most significant, or most common component of each of the first data clusters, to produce a plurality of de-weighted first data clusters. In this example embodiment, the cluster analysis module 114 merely deletes the largest component. Thereafter, the cluster analysis module 114 parses the plurality of de-weighted first data clusters back to the clustering module 212 which performs (at block 208) a second pass (n now equals 2) of clustering on the plurality of de-weighted clusters, to produce a plurality of second data clusters.

The method 200 may be performed iteratively or repetitively. In this example embodiment, it may be considered that there is no singular objectively "correct" clustering or similarity measure. It may also be considered that multiple clustering and manipulation iteration may be discovered that provide multiple perspectives. Since there may be infinitely many, or at least a very large number of, ways of comparing objects with real variables or exponentially many ways of grouping objects with variables of finite domains, an efficient method of selecting a similarity measure may be advantageous to break or represent non-uniqueness. The example embodiment may provide a method of removing information learned in previous iterations of cluster finding to find new hidden clusters brought to light by subsequent iterations.

Figure 3:
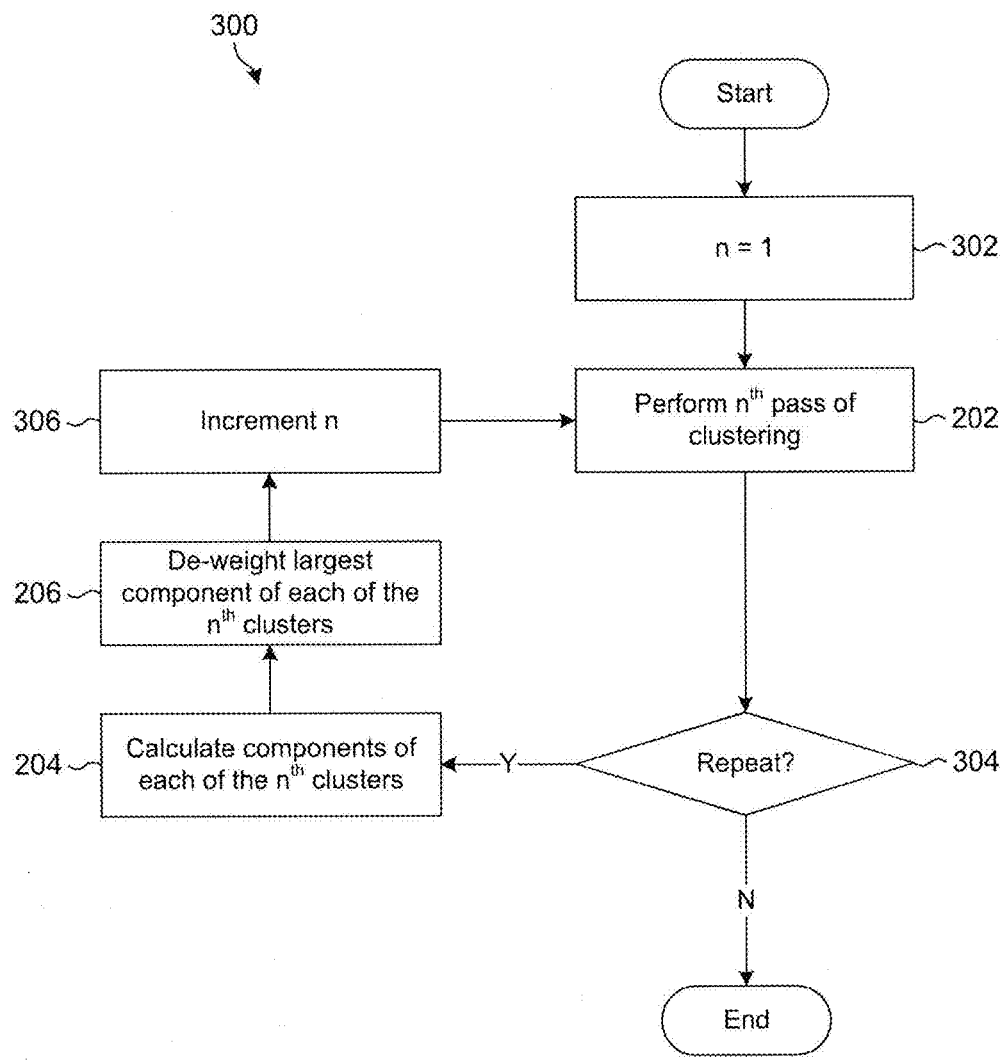
FIG. 3 illustrates a flow diagram of the method of FIG. 2 in a more advanced implementation.

FIG. 3 illustrates a more specific example of a method 300, which is a more developed version of the method 200. The method 300 is described with reference to data 400 illustrated in FIG. 4.

Figure 4:
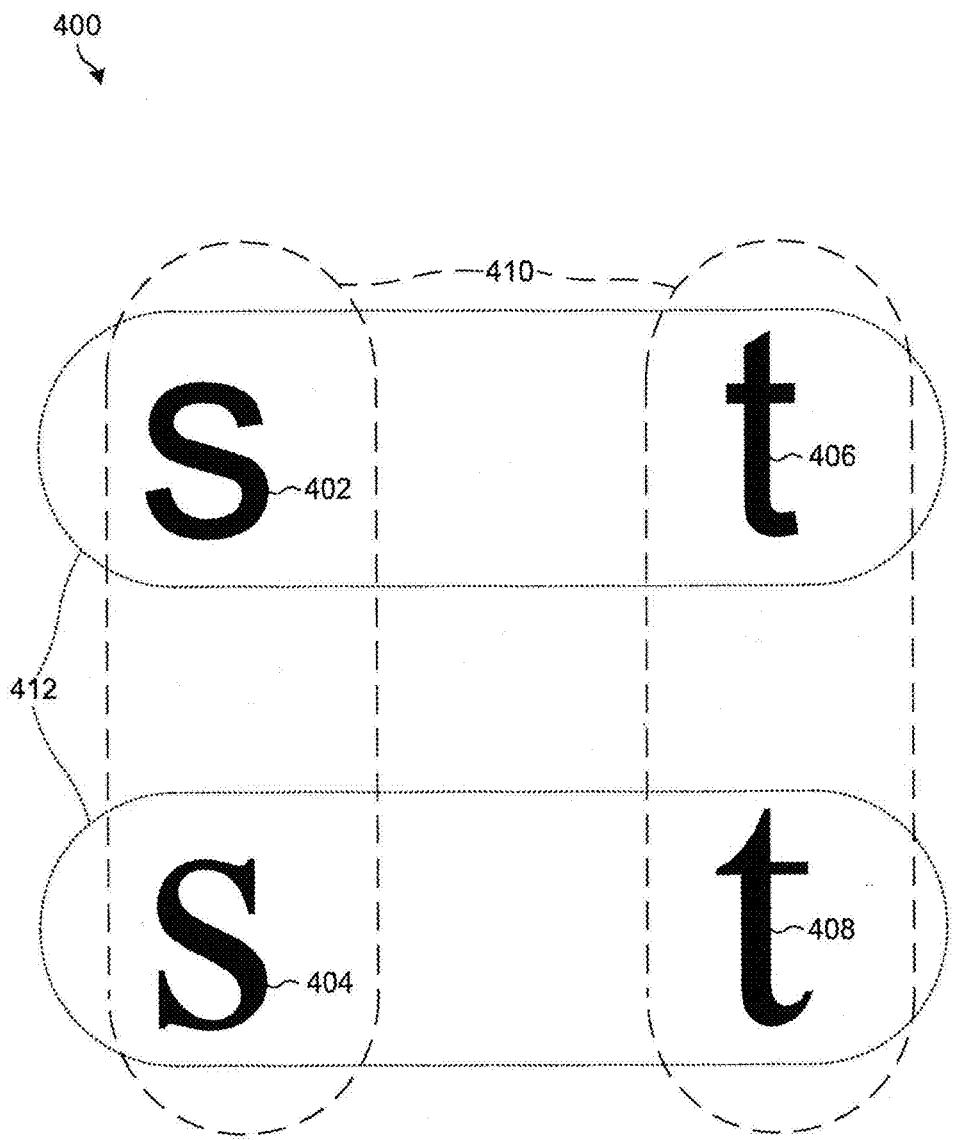
FIG. 4 illustrates example set of data to which the method of FIG. 3 may be applied.

FIG. 4 illustrates a simplified (perhaps even over-simplified and not fully technically accurate) example of data 400, comprising characters including an Arial-font letter "s" 402 and letter "t" 406 and a Times New Roman-font letter "s" 404 and letter "t" 408. This data 400 may be considered a simplified version of the M-NIST hand-writing database. This M-NIST database is routinely clustered forming groups with each of the digit types in their own cluster. However, it is overlooked that a data explorer may not be interested in the actual identity digit but rather whether a digit is serif or san-serif. This font style may be orthogonal or "tangential" to the character or numeric value. By removing the information of the obvious numeric clustering, more subtle groupings may be found.

The method 300 begins (at block 302) with a first clustering pass (that is, n=1) and the data 400 is clustered (at block 202). In this example, a most prominent similarity/disparity between the characters 402-408 of the data 400 is the character value, that is, that they are either the letter "s" or the letter "t". This feature may be so prominent that it dwarfs any other similarities/disparities which are then discarded is being insignificant. Accordingly, applying the similarity measure reveals this characteristic and the data 400 is clustered accordingly to create a plurality of first clusters 410. More specifically, the letters "s" 402, 404 are clustered together and the letters "t" 406, 408 are clustered together. The first clusters 410 are illustrated with long broken lines.

The method 300 may repeat (at block 304) at least once. The cluster analysis module 114 resolves (at block 204) the components of the plurality of first clusters 410 and then de-weights (at block 206) the largest component of each which, in this example, relates to the feature of the characters 402, 404 being the letter "s" and the characters 406, 408 being the letter "t". By way of visual illustration, an average S (an "average"/overlap/common "s" between the serif and san-serif characters 402, 404) is subtracted, leaving only those features which differ, e.g., serif and san-serif tails/endings. The same applies to the "t" characters 406, 408.

The pass number is incremented (at block 306) to become the second pass. In this second pass, the clustering module 112 produces (at block 202) a plurality of second data clusters 412. Now, the characters 402-408 are clustered differently, as illustrated by short broken or dotted lines. The sans-serif characters 402, 406 have been clustered together and the serif characters 404, 408 have been clustered together. In the absence of a primary feature of the first round of clustering (the identity of the letters "s" 402, 404 and "t" 406, 408), the serif status may be the most prominent feature of the second pass of clustering.

If the method is reiterated (n=3), other features could come to light, e.g., style (italic vs. non-italic), color (black vs. gray), etc. Each pass may reveal a new perspective, which may be useful. This may be considered as a way of orthogonal or tangential clustering, to reveal iteratively new features or components which may only appear once more prominent (but not necessarily more relevant) features have been de-weighted or removed entirely. The method 200, 300 may thus be used to:

provide a way of discovery of tangential clusters;

create a systematic chain of clustering arrangements and rearrangements;

provide a feature mapper based on the iterative de-weightings;

discover a multiplicity of useful similarity measures; and/or ignore known information in pursuit of new hidden or subtle information.

The clustering in accordance with the method 200, 300 may be presented on a display device in a cascading or hierarchical structure, showing at least one prominent feature for each pass of level of clustering. The prominent feature may be the one that ends up being de-weighted. In this fashion, the computer system 100 may present a convenient human-readable output of the method 200, 300.

The method 200, 300 of an example embodiment of the invention may reveal interesting even unexpected hidden relationships amongst the data points of the data 400. The iterative clustering may be stopped when a sufficiently interesting clustering step is performed or when clustering breaks down and no further good clusters form (e.g. there's only noise left). When clustering stops, a user has a clustering hierarchy produced up till that stop point to work with and analyze relationships.

In a supervised context, data points may have good quality labels (which may imply that the user already knows what they are looking for (so no non-uniqueness problem) and the data already forms good clusters (so no clustering problem)). For machine or deep learning, a challenge may be to place a new unseen data point into one of the known clusters and a deep learning solution may be to train a network to see what aspects of the data points help the most when deciding to place a point.

The feature mapper may help reduce or organize aspects of one or more data points in a set of data. For example, an individual data point may have too many aspects or features to be processed. A feature mapper may be realized using the iterative data clustering and de-weighting in accordance with an example embodiment of the invention. This feature mapper may assist with data reduction. A hierarchy of orthogonal clusters may provide useful data reduction or a pre-processing step for supervised machine learning.

The method 200, 300 may be implemented on data (whether unstructured data or structured data ignoring data labels), e.g., the data 400, to produce a hierarchy. The method 200, 300 may be iterated until no more good/useful clusters form (at say n+1). Then every de-weighting (or projection) of every clustering step at every previous level (1 ... n) may be used to perform the data reduction. For machine learning, the commonality calculation between the data point and each de-weighting component from the hierarchy may be used to construct a reduced vector. The reduced vector may be shorter than the data points and each of the de-weighting components and the reduced vector may then be used for machine learning.

The method 200, 300 may also include overlaps with the common components of the labeled clusters as part of the final reduced representation or even start clustering 202 using the labeled clusters, so that the data reduction step makes use of the information in the labels.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of clustering data, the method comprising:
   performing, by a clustering module, an nth pass of clustering on data to produce a plurality of nth clusters;
   calculating, by a cluster analysis module, a plurality of components of each of the nth clusters;
   de-weighting, by the cluster analysis module, a largest or most common component of each of the nth clusters to produce a plurality of de-weighted nth clusters; and
   performing, by the clustering module, an n+1th pass of clustering on the plurality of de-weighted nth clusters to produce a plurality of n+1th clusters, wherein the n+1th pass of clustering excludes the largest or most common component of each of the nth clusters, wherein the n+1th pass of clustering creates different clusters of the data from the nth pass of clustering the nth pass of clustering and the n+1th pass of clustering being different iterations of clustering, wherein n+1 pass clustering is performed subsequent to the nth pass of clustering.

2. The method of claim 1, which further comprises:
   calculating, by the cluster analysis module, a plurality of components of each of the n+1th clusters; and
   de-weighting, by the cluster analysis module, a largest or most common component of each of the n+1th clusters to produce a plurality of de-weighted n+1th clusters.

3. The method of claim 1, wherein performing clustering comprises using at least one standard similarity measure or norm.

4. The method of claim 1, wherein calculating the plurality of components comprises at least one of:
   applying a compressed sensing approach to find a sparse representation;
   calculating a plurality of mean components; and/or
   applying archetypal analysis.

5. The method of claim 1, wherein de-weighting the largest or most common component comprises removing or deleting the largest or most common component.

6. The method of claim 1, wherein de-weighting the largest or most common component comprises applying at least one of:
   orthogonal projection;
   Principal Component Analysis (PCA);
   eigenvector matrix analysis;
   non-negative matrix factorization; and
   archetypal analysis.

7. The method of claim 1, wherein the data is unlabeled, unstructured, or unsupervised data.

8. The method of claim 2, which is implemented iteratively or repetitively, thereby to perform orthogonal clustering of the data.

9. The method of claim 2, which is implemented iteratively or repetitively, thereby to create a systematic chain of clustering arrangements and rearrangements.

10. The method of claim 2, which is implemented iteratively or repetitively and wherein the iterative de-weightings form a feature mapper.

11. The method of claim 2, which comprises displaying the data, each of the plurality of clusters, and each of the plurality of de-weighted clusters visually on a display device.

12. A computer system for clustering data, the computer system comprising:
    a computer processor; and
    a computer readable storage medium having stored thereon program instructions executable by the computer processor to direct the operation of the processor, wherein the computer processor, when executing the program instructions, comprises:
      a clustering module configured to perform an nth pass of clustering on data to produce a plurality of nth clusters; and
      a cluster analysis module configured to:
        calculate a plurality of components of each of the nth clusters; and
        de-weight a largest or most common component of each of the nth clusters to produce a plurality of de-weighted nth clusters; wherein:
      the clustering module is configured to perform an n+1th pass of clustering on the plurality of de-weighted nth cluster to produce a plurality of n+1th clusters, wherein the n+1th pass of clustering excludes the largest or most common component of each of the nth clusters, wherein the n+1th pass of clustering creates different clusters of the data from the nth pass of clustering, the nth pass of clustering and the n+1th pass of clustering being different iterations of clustering, wherein n+1 pass clustering is performed subsequent to the nth pass of clustering.

13. The computer system of claim 12, wherein the cluster analysis module is further configured to:
    calculate a plurality of components of each of the n+1th clusters; and
    de-weigh a largest or most common component of each of the n+1th clusters to produce a plurality of de-weighted n+1th clusters.

14. The computer system of claim 12, wherein the cluster analysis module is configured to perform clustering using at least one standard similarity measure or norm.

15. The computer system of claim 12, wherein the cluster analysis module is configured to calculate the plurality of components by at least one of:
    applying a compressed sensing approach to find a sparse representation;
    calculating a plurality of mean components; and
    applying archetypal analysis.

16. The computer system of claim 12, wherein the cluster analysis module is configured to de-weight the largest component by removing or deleting the largest component.

17. The computer system of claim 12, wherein the data is unlabeled, unstructured, or unsupervised data.

18. The computer system of claim 13, which is configured to implement clustering and de-weighting iteratively or repetitively, thereby to perform at least one of:
tangential clustering of the data;
creation of a systematic chain of clustering arrangements and rearrangements;
forming a feature mapper; and
displaying of the data, each of the plurality of clusters, and each of the plurality of de-weighted clusters visually on a display device.

19. A computer program product for clustering data, the computer program product comprising:
a computer-readable medium having stored thereon:
first program instructions executable by a computer processor to cause the computer processor to perform an nth pass of clustering on data to produce a plurality of nth clusters;
second program instructions executable by the computer processor to cause the computer processor to calculate a plurality of components of each of the nth clusters; and
third program instructions executable by the computer processor to cause the computer processor to de-weight a largest or most common component of each of the nth clusters to produce a plurality of de-weighted nth clusters; wherein:
the first program instructions are additionally executable by the computer processor to cause the computer processor to perform an n+1th pass of clustering on the plurality de-weighted nth clusters to produce a plurality of n+1th clusters, wherein the n+1th pass of clustering excludes the largest or most common component of each of the nth clusters, wherein the n+1th pass of clustering creates different clusters of the data from the nth pass of clustering, the nth pass of clustering and the n+1th pass of clustering being different iterations of clustering, wherein n+1 pass clustering is performed subsequent to the nth pass of clustering.

20. The computer program of claim 19, wherein:
the second program instructions are additionally executable by the computer processor to cause the computer processor to calculate a plurality of components of each of the n+1th clusters; and
the third program instructions are additionally executable by the computer processor to cause the computer processor de-weight a largest or most common component of each of the n+1th clusters to produce a plurality de-weighted n+1th clusters.

* * * * *